United States Patent [19]

Rutshtein et al.

[11] 4,119,391

[45] Oct. 10, 1978

[54] METHODS AND SYSTEMS FOR CONTROLLING THE OPERATION OF MEANS FOR COMPRESSING A FLUID MEDIUM AND THE CORRESPONDING NETWORKS

[75] Inventors: Alexander Rutshtein; Naum Staroselsky, both of West Des Moines, Iowa

[73] Assignee: Compressor Controls Corporation, Des Moines, Iowa

[21] Appl. No.: 530,610

[22] Filed: Dec. 9, 1974

[51] Int. Cl.$^2$ ...................... R04B 49/00; G05D 11/02

[52] U.S. Cl. ........................................ 417/26; 137/99

[58] Field of Search ...................... 137/100, 118, 567; 417/26-29, 2-8

[56] References Cited

U.S. PATENT DOCUMENTS

| | | | |
|---|---|---|---|
| 1,621,683 | 3/1927 | Pogue | 137/118 |
| 2,240,775 | 5/1941 | Heltzel et al. | 417/4 |
| 2,270,304 | 1/1942 | Jacobsson | 137/118 |
| 2,397,443 | 3/1946 | Stratham et al. | 417/2 |
| 2,601,849 | 7/1952 | Lee | 137/118 |
| 2,813,231 | 11/1957 | Hyde | 417/2 |
| 2,942,866 | 6/1960 | Anderson | 417/2 |
| 3,062,271 | 11/1962 | Rijnsdorp | 137/100 |
| 3,068,796 | 12/1962 | Pflugor et al. | 417/26 |
| 3,092,127 | 6/1963 | Bracken | 137/118 |
| 3,151,199 | 9/1964 | Flynn et al. | 417/6 |
| 3,294,105 | 12/1966 | Schaub | 137/118 |
| 3,424,079 | 2/1969 | Wylupek | 137/100 |
| 3,493,005 | 2/1970 | Kakegawa | 137/100 |
| 3,556,126 | 1/1971 | Osward | 137/118 |
| 3,716,305 | 2/1973 | Oberlander | 417/2 |
| 3,844,683 | 10/1974 | Albert | 417/6 |

FOREIGN PATENT DOCUMENTS

| | | | |
|---|---|---|---|
| 118,131 | 1/1944 | Austria | 417/5 |
| 5,723 | 10/1964 | U.S.S.R. | 417/4 |

*Primary Examiner*—William L. Freeh
*Attorney, Agent, or Firm*—Henderson, Strom, Sturm, Cepican & Fix

[57] ABSTRACT

Systems and methods are disclosed for the automatic control of one or more pumping and compressing machines and of the related fluid network. The purpose of such systems and methods is to maintain only the required pressure just after a source or just before a user so as to reduce the compressing or pumping energy required; to divide the load within a group of one or more compressing or pumping machines so as to compress the fluid with reduced use of energy and improved pressure control; to improve protection of the turbo compressors when used in parallel from dangerous levels of operation.

3 Claims, 15 Drawing Figures

METHODS AND SYSTEMS FOR CONTROLLING THE OPERATION OF MEANS FOR COMPRESSING A FLUID MEDIUM AND THE CORRESPONDING NETWORKS

BACKGROUND OF INVENTION

Purposes of Invention

This invention relates to several improved automatic control systems for (a) machines compressing or pumping liquid, gaseous and slurry mediums and for (b) the networks and control elements which connect these compressing or pumping machines with either the sources or the users of the liquid, gaseous or slurry mediums. This invention relates for example, to the compressing or pumping stations and the related pipelines used to transport natural gas, oil, gasoline, water, etc. over various distances and the related network of pipeline and control elements; to compressors and compressing stations producing compressed air for ventilation and for pneumatic mechanisms and the related network of pipeline and control elements; to compressors or pumping stations compressing various gases, liquids or slurries in chemical or metallurgical plants and to the related network of pipeline and control elements and so on.

For the purposes of this invention the following terms are defined.

Compressing means — a single compressing or pumping machine of any kind or a group of such machines.

Compressing station — two, or more than two, compressing or pumping machines in a group.

Fluid — a gaseous, liquid or slurry medium.

Source — a technological unit which supplies liquid, gas or slurry medium to a compressing means. This may be, for example, a well head, an accumulator, another compressing or pumping station, a chemical process unit, etc. Several closely connected sources may be treated as one source.

User — technological unit which receives, stores or processes the liquid, gas, or slurry, from a compressing means and fluidly connected to that means. This may be, for example, an accumulator of any kind, another compressing means, a chemical process unit, a pneumatic machine, etc. Several closely connected users may be treated as one user.

Many other well known terms of art used herein are defined in "Process Measurement and Control Terminology" copyrighted in 1970 by the Process Measurement and Control Section of the Scientific Apparatus Makers Association, 370 Lexington Avenue, New York, N.Y. 10017, which is incorporated herein by reference.

The main purposes to be achieved by the described automatic control systems of compressing means, the related pipeline network and control elements connecting them to the sources or users of fluid are:

(1) To maintain the required pressure either just before the users or just after the sources so as to minimize the compressing energy required;

(2) Or to increase the process efficiency of the source or user such as the conversion efficiency of a chemical or other process, or to improve product quality in a manufacturing or conversion process.

(3) Or to divide the load between the compressing units so as to compress the fluid with the reduced use of energy.

(4) Or by improved automatic control of compressing stations to improve protection of the compressing units from dangerous levels of operation.

Some Prior Art Systems

Some of the prior art systems for automatic control of the separate units for compressing fluids or for the compressing stations, related networks and control elements, provide for maintaining a pressure either in the discharge outlet of the compressing station or in the suction inlet thereof. However, the idea of maintaining the pressure directly before or after these compressing units is, in the majority of cases, incorrect in principle. In fact, the required pressure is not demanded for the machines which compress the fluid, but for the technological units which supply, process or use the fluid. With respect to the pressure just after the sources or just before the users, this pressure depends not only upon the pressure in the suction inlet or in the discharge outlet of the compressing station, but it also depends upon the flow rate of the fluid flowing through the pipes, and upon the geometry of the network connected with the inlet or outlet of the compressing stations. This geometry is often variable with time.

Some Principles of This Invention

When the flow rate or the geometry of the network changes, the pressure losses on the section of the pipeline between the pumping or compressing station and the source or the user of the fluid medium also changes. It may be desirable to maintain the pressure just after source or just after a user to control the process at or in the source or user. This means that in order to maintain the same required pressure just after the source or just before the user of the fluid medium, the pressure just before or just after the compressing station, in general, has to changed accordingly. Also, it must be taken into consideration that the losses of pressure of the different sections between the compressor or pumping station and the different sources or users are, in general, not equal. It is therefore evident that with the increasing losses of pressure, for example between the compressing station and a given user, a higher pressure must be maintained just after such station or order to obtain the required pressure before the user.

In many cases one compressing station serves a number of sources or users.

The above principals apply to a single compressing or pumping machine as well as to a compressing or pumping station.

Each source or each user is connected with a compressing station by some network which, in general, may include pipes of different diameters, heat exchange apparatus, reactors, valves, etc. Under any given pressure before or after a particular compressing station, the losses of the pressure between the station and each of the sources or users are generally not equal. At any given moment there always exists a source or a user for which the pressure losses between it and the compressing station are maximum. This source or user shall be called "A".

It is sometimes necessary, or at least desirable, to maintain the same required pressure just after a number of sources or just before a number of users located at different locations. The most rational method of controlling such a network is to maintain the pressure just before or just after the compressing station at an appropriate level so that the pressure (taking into account pressure losses along the line) just after the source or just before the user "A" would be equal to the required level. Then the pressure just after each of the other sources or just before each of the other users can be maintained at the required level by throttling the flow of the fluid.

Under simultaneous operation of a group of compressing units from a common inlet or to a common discharge header, the total delivery of the units in general changes with time.

Under simultaneous operation of a group of compressing means having a common inlet or a common discharge header, the total delivery of said means in general changes with time according to the demands of the corresponding sources or users. Under these conditions there exists the problem of how to distribute the common load between the simultaneously working machines.

The distribution of the load should be done automatically, both in case of decreasing or increasing of the total delivery, and in such a way as to provide the best economy of the group of compressing means at partial load situation. It is also important to take into consideration all of the gas dynamic characteristics of the means, particularly their type (e.g. turbo or reciprocating), the presence of the surge zones of turbomachines used for compressing a gaseous medium and also the method of connection of the compressing means with respect to each other.

In some cases the compressing means supply only one user or they receive the fluid from only one source (it being understood that "user" or "source" can also mean a group of closely situated users or sources). In some of these cases, the geometry of the network connecting said units with sources or users will be invariable in time and for this reason the task of maintaining the constant pressure just after the source or just before the user becomes considerably simpler than for the complex network situation discussed above.

SUMMARY OF THE INVENTION

The present invention relates to systems and methods for maintaining a constant pressure at one or more points in a network of fluid mediums through the control of compressing means and also the throttling means installed immediately before the users or after the sources of said medium. The compressing means are operated as much as is possible in the most efficient range thereof, while producing only as much output as is required to maintain the desired constant pressure.

An object of the present invention is to achieve a required constant pressure at one or more points in a network of fluid mediums having one or more users or sources, spaced from a compressing means.

Another object of the present invention is to operate compressing means such as turbocompressors as much as possible in the most efficient range thereof while sustaining the desired constant pressure at the control point or points.

Still another object of the present invention is to operate compressing means only as much as is required to sustain the desired pressure at the control point or points to thereby save the energy normally expended to sustain a desired constant pressure immediately before or after said compressing means or stations.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
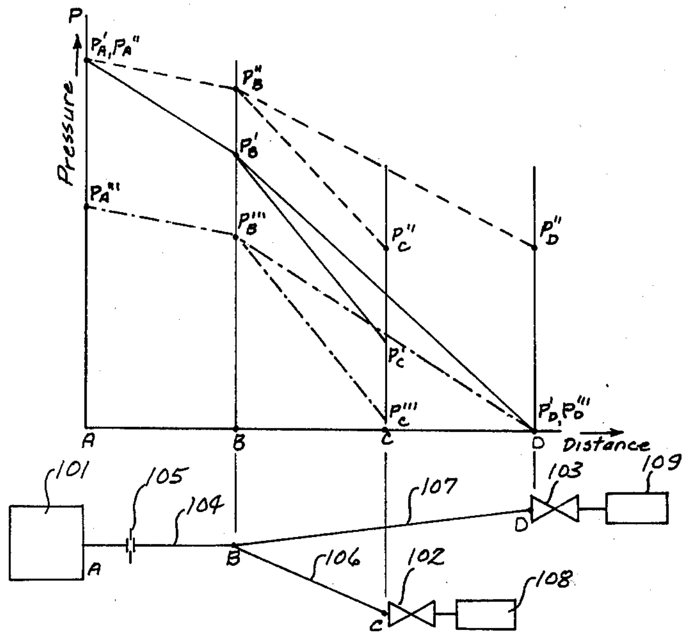
FIGS. 1, 2 and 3 illustrate graphically the change of pressure on the separate parts of a network connecting a compressor station with sources or users when the rate of flow of fluids is changed according to two different methods of controlling of the network, the usual method and the improved method described in this invention.
Figure 2:
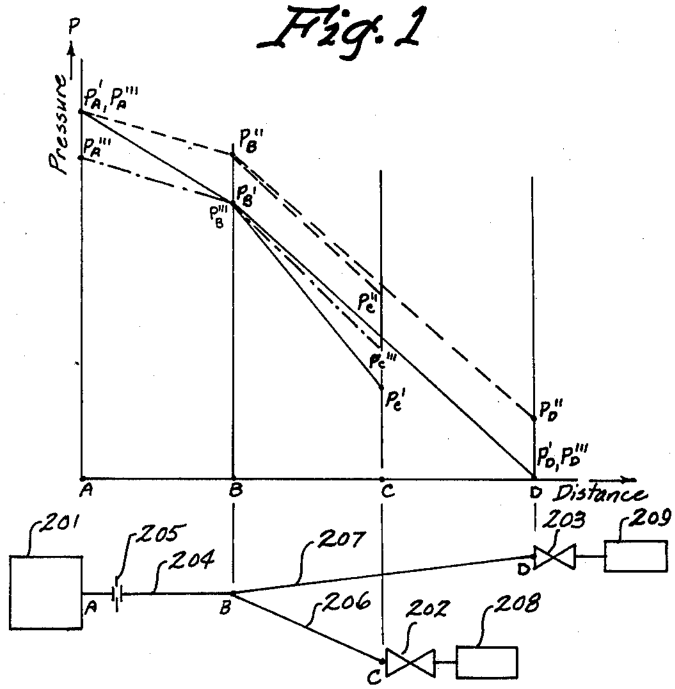

The network of compressed fluid shown in FIGS. 1 and 2 consists of a group of compressing means 101 or 201, a throttle 102 or 202 before the first group of users 108 or 208, throttles 103 or 203 before the second group of the users 109 or 209, pipes 104 and 204, and measuring devices 105 or 205 for measuring flow rates.

In general the compressing means 101 or 201 may be comprised of compressors or pumps connected in parallel, in series or both ways simultaneously. Points "A" on FIG. 1 or 2 correspond to certain pressures measured just after the compressing means 101 or 201. Points "B" correspond to certain pressures measured at the end of the common section 104 or 204 of the pipelines. Points "C" correspond to certain pressures measured at the point of the pipelines 106 or 206 directly before the throttles 102 or 202 of the first group of users 108 or 208, and the point D to certain pressures measured at the point of pipelines 107 or 207 just before the throttles 103 or 203 of the second group of users 109 or 209.

On FIG. 1, the superscript ′ corresponds to the maximum consumption of the compressed fluid by both groups of users 108 and 109; superscript ″ corresponds to the usual method which provides maintaining constant pressure at point "A" under a lower rate of consumption by the second group of users 109; and superscript ‴ refers to the same reduction of consumption by the second group of users 109 but maintaining a constant pressure at point "D", which is the improved method.

On FIG. 2 the superscript ′ also corresponds to the maximum consumption by both groups of users 208 and 209; superscript ″ refers to the usual method which provides maintaining of constant pressure at point "A" under a lower rate of consumption by the first group of the users 208; and superscript ‴ refers to the maintaining of constant pressure at point "D" under a lower rate of consumption by the first group of users 208 which is the improved method.

For the network of compressed fluid shown in FIGS. 1 or 2, on each of the sections of the pipeline the losses of pressure can be calculated according to the following formulas:

$$\left.\begin{array}{l} P_A^i - P_B^i = \dfrac{K_1 (G_C + G_D)^2}{\gamma_A} \\ P_B^i - P_C^i = \dfrac{K_2 G_C^2}{\gamma_B}\ ;\ P_B^i - P_D^i = \dfrac{K_3 G_D^2}{\gamma_B} \end{array}\right\} \quad (1)$$

where:

$P_A^i$, $P_B^i$, $P_C^i$, and $P_D^i$ are the pressures correspondingly in points "A", "B", "C", and "D"; $K_1$, $K_2$, and $K_3$ are constant coefficients; $G_C$ and $G_D$ are the mass flow rates of fluid going respectively to the users situated directly after points "C" and "D"; $\gamma_A$ and $\gamma_B$ are the specific weights of the compressed fluid at the points "A" and "B", respectively; "$i$" is the superscript ′, ″ or ‴.

Consideration will now be given to two different methods of controlling the above described network, the usual method and the improved method.

Irrespective of which method is used, assume that for both groups of users an equal and constant pressure is required. The first or usual method, which is in widespread use in industry, is to maintain a constant pressure just after the compressor station at point "A", i.e. $P_A =$ Constant.

Assume also that during maximum consumption of the compressed fluid, the losses of pressure up to the second group of users 109 or 209 at point "D" are more than the losses up to the first group of users 108 or 208 at point "C". When the throttles 103 or 203 before this second group of the users 109 or 209 are completely opened, then the pressure at point "D" is $P_D' = P_D$. The losses up to the first group of users 108 or 208 at point "C" are, by definition, less than the losses up to point "D", and consequently the pressures of the compressed fluid before these users have this following relationship: $P_C' > P_D'$. In order to level the pressure before both groups of users 108 and 109, or 208 and 209, the throttle 102 or 202 must then be partially closed.

In FIG. 1 when the consumption of the second group of users 109 is reduced, the losses of pressure on the sections of pipeline B–D and A–B will become smaller and, with a constant flow rate through the first group of the users 108 and a constant pressure at point "A", then the pressures before both throttles 102 and 103 will increase. Therefore in order to maintain constant pressure before the users 108 and 109, both throttles 102 and 103 must be partially closed, i.e. the throttling of 102 and 103 must be increased to compensate for the smaller losses of pressure in the pipeline sections A–B and B–D. For this first or usual method, that of maintaining a constant pressure at point "A" as shown in FIG. 1, an analogous relationship can be observed in FIG. 2 where the flow rate at point "D" is constant and the flow rate at point "C" is reduced.

The second and improved method of controlling the networks of FIGS. 1 and 2 consists in maintaining a variable pressure after the compressor station 101 or 102 at point "A". This pressure depends upon the flow rate of the fluid and the geometry of the network. Assume that while the flow rate in section A–B is being reduced, the pressure at point "D" is maintained constant, not by means of throttling, but by reducing the pressure at point "A". It follows from FIGS. 1 and 2 that when the output of the compressing station is being reduced, the pressure at point "A" in the discharge header of compressor station 101 or 201 will be lower than maximum flow rate. This means that under all partial loads the compression ratio, and consequently the energy expended for the compressing of fluids will be lower by using this improved method, than by the usual method of maintaining constant pressure in point "A". An analogous situation also takes place when one group of compressors or pumps serves two or more sources of fluid situated at different distances from this group of compressing means.

When there is only one group of users, for example, at point "D", (FIG. 1), then the losses of pressure in the network can be determined as follows:

$$P_A - P_D = \frac{KG^2}{\gamma_A} \quad (2)$$

Also, for the measuring device 105, it is true that $$\frac{G^2}{\gamma_A} = MH, \quad (3)$$

where "M" is the constant coefficient and "H" is the dynamic difference of pressures on the measuring device 105.

According to formulas (2) and (3).

$$P_A - P_D = K_1 H, \quad (4)$$

where $$K_1 = K M.$$

From equation (4) it is evident that in order to maintain a constant pressure before the user at point "D", it is necessary to fulfill the following relationship:

$$P_A - K_1 H = P_D = \text{Constant} \quad (5)$$

But under any other operating conditions it is also necessary that:

$$P_A' - K_1 H' = P_D$$

i.e., $$(P_A - P_A') - K_1 (H - H') = 0$$

or $$\Delta P = K_1 \Delta H \quad (6)$$

where $H = H - H'$. So, to maintain constant pressure before one group of users during a change of their consumption rate, it is necessary to maintain the pressure after the group of compressing means 101 in such way that the ratio between the increments of the dynamic difference (H) on the measuring device 105 and the increments of pressure at point "A" would also stay constant.

Consideration will now be given to the case where the group of compressing means are turbomachines working in parallel on a common discharge header. Assume that the fluid in this case goes to one group of users which is situated after the point "D" (FIG. 1).

In such a case, the formula (2) becomes:

$$P_A - P_D = \frac{K \sum_{i=1}^{j} (G_i)^2}{\gamma_A} \quad (7)$$

$$\text{If } G_1 = F_1 \sum_{i=1}^{j} G_i;\ G_2 = F_2 \sum_{i=1}^{j} G_i, \ldots\ G_j = F_j \sum_{i=1}^{j} G_i,$$

where:

$F_1, F_2 \ldots F_j$ are constant coefficients, (it should be understood that $$\sum_{i=1}^{j} F_i = 1);$$

"$i$" is the ordinal number of a given machine; "$j$" is the number of machines working in parallel, then the equation (7) can be easily transformed into the following systems of equations:

$$\left.\begin{aligned} P_A - P_D &= K\left[1 + \frac{D_2}{D_1} + \frac{D_3}{D_1} + \ldots + \frac{D_j}{D_1}\right]^2 \frac{G_1^2}{\gamma_A} \\ P_A - P_D &= K\left[1 + \frac{D_1}{D_2} + \frac{D_3}{D_2} + \ldots \frac{D_j}{D_1}\right]^2 \frac{G_2^2}{\gamma_A} \\ &\ldots\ldots\ldots\ldots\ldots\ldots \\ P_A - P_D &= K\left[1 - \frac{D_1}{D_j} + \frac{D_2}{D_j} + \ldots + \frac{D_{j-1}}{D_j}\right]^2 \frac{G_j^2}{\gamma_A} \end{aligned}\right\} \quad (8)$$

If a measuring device for measuring flow rate is installed after each of the turbomachines working in parallel, then the system of equations (8) can be simplified considerably into the following form:

$$\left.\begin{aligned} P_A - \alpha_1 H_1 &= P_D \\ P_A - \alpha_2 H_2 &= P_D \\ &\ldots\ldots \\ P_A - \alpha_j H_j &= P_D \end{aligned}\right\} \quad (9)$$

where $\alpha_i$ represents a constant coefficient and $H_i$ represents the differences of pressures on the measuring devices installed after each of the turbomachines. By analogy with equation (6), it is reasonable to assume that to provide a constant pressure before the group of the users at point "D", it is sufficient to maintain on each of the turbomachines working in parallel, a constant ratio between the increments of the dynamic difference (ΔH) on the measuring device installed in its delivery and the increments of the pressure (ΔP) in the delivery, i.e.

$$\frac{\Delta P}{\Delta H_i} = K_i \quad (10)$$

Consequently, both the problem of maintaining a constant pressure before the user and the problem of distributing the common load between turbomachines working in parallel can be simultaneously solved.

Figure 3:
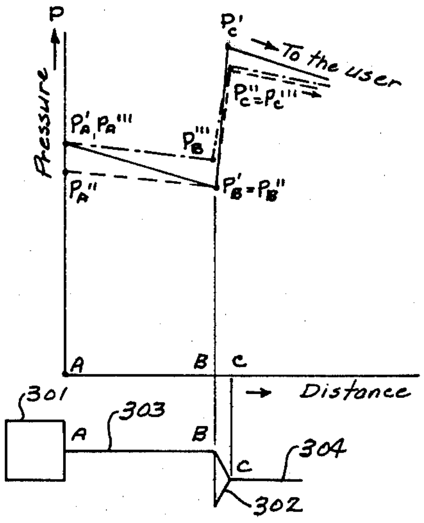

The diagram of the network of compressed fluid shown in FIG. 3 consists of a source of fluid 301, a turbomachine 302 compressing this fluid, pipeline 303 connecting the turbomachine 302 with the source 301, and a pipeline 304 connecting the turbomachine 302 with the user.

The points $P_A$ on the graph in FIG. 3 correspond to the pressures after the source 301, points $P_B$ to the pressures before the turbomachine 302 and the points $P_C$ to the pressures after the turbomachine 302. The superscript ′ corresponds to the maximum flow rate of the fluid; the superscript ″ corresponds to the minimum flow rate while maintaining by the usual method a constant pressure before turbomachine 302; and the superscript ‴ refers to minimum flow rate while maintaining by the improved method a constant pressure after the source 301.

A comparison will now be made between the usual method of control where the pressure before the turbomachine is kept constant $$P_B' = P_B'' = P_B$$

and the improved method of control where the pressure just after the source 301 is kept constant $$P_A' = P_A''' = P_A$$

For the network shown in FIG. 3 the losses of the pressure therein can be estimated according to the following formula:

$$P_a^i - P_B^i = \frac{K_1 G^2}{\gamma_A}$$

where $P_A^i, P_B^i, P_C^i$ are the pressures corresponding to points "A", "B" and "C"; "G" is the mass flow rate of the fluid; $K_1$ is a constant coefficient determined by the geometry of the pipeline 302; and $\gamma_A$ is the specific weight of the fluid at the point "A", "$i$" is the superscript ′, ″, or ‴.

Assume that $P_A = P_A' = P_A'''$ is required pressure at point "A". From the graph shown in FIG. 3 it can be appreciated that operating under the maximum flow rate of the fluid both of the above mentioned methods of maintaining pressure are equivalent.

However, under the minimum flow rate or under any partial loads, the situation changes. Assume that $P_A = P_A' = P_A'''$ is the required pressure at point "A". The improved method, which forms an important part of this invention, not only better satisfied the technological demands of the source, but also reduces the compression ratio of the turbomachine 302 at partial loads, and therefore also reduces the energy expense for compressing the fluid, as compared with the usual method.

Indeed, the pressure in point "C" depends only on flow rate of the fluid (assuming the geometry of the network connecting compressor 302 and the user of fluid stays constant).

The pressure in point "B" depends on the methods of control and under any partial loads will be evidently lower when using the usual method which maintains constant pressure before the compressor. Consequently the compression ratio in this case will always be higher than the compression ratio while using the improved method which maintains constant pressure directly after the source 301.

It is important to mention here that in many cases maintaining the required pressure just after the source when the source is a chemical process unit will provide for better conversion efficiency of the chemical process and consequently for increasing the capacity of the chemical plant.

Figure 4:
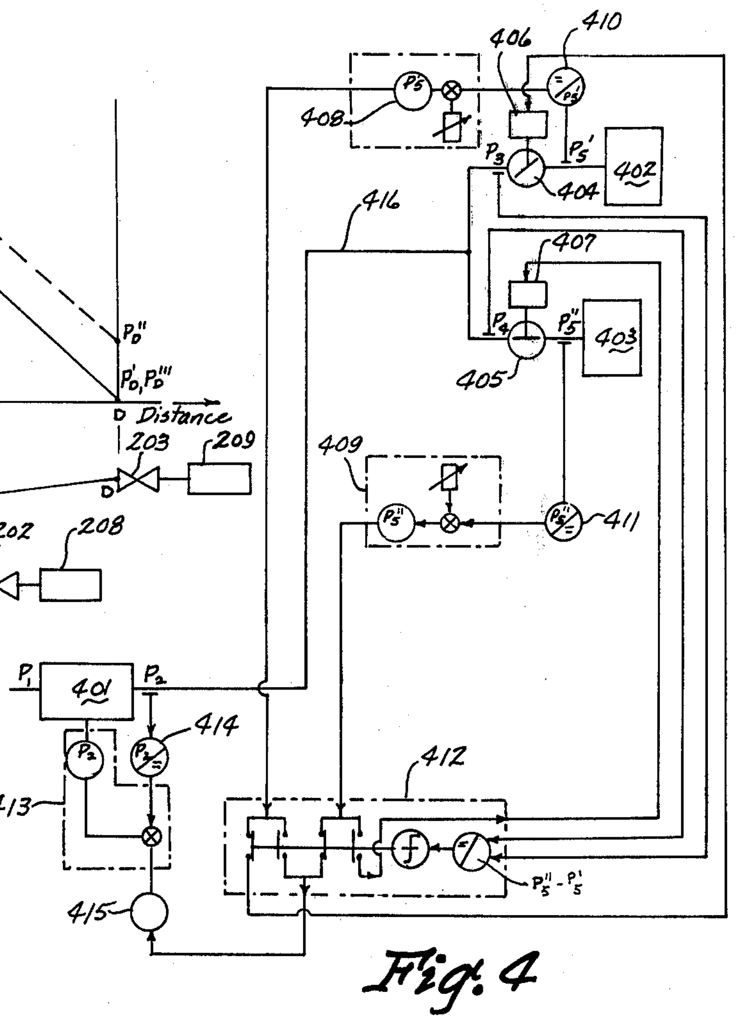
FIG. 4 shows a schematic diagram of automatic control for a network of fluids having more than one group of users.

FIG. 4 shows the scheme of the automatic control system for a network of compressed fluid. FIG. 4 includes: a group of compressing means units 401; a group of users 402 and 403 of the fluid; before each of the users are installed the throttles 404 and 405, having actuators 406 and 407 associated therewith; pressure controllers 408 and 409 for controlling the pressure of the fluid before the users 402 and 403 and having pressure transducers 410 and 411 associated therewith; a program switch 412; a system of automatic controls 413 for regulating the pressure after the group of means 401, and having a pressure transducer 414 associated therewith; and a program set point device 415 which is controlled by the output signals of one of the controllers 408 or 409. The program set point device 415 is optional and has an input variable which sets the desired value of the controlled variable.

It is evident that when the total consumption of fluid changes it is still possible to maintain the required pressure at any point in the above described network. For example, when the consumption of fluid changes, then the controllers 408 and 409, by acting upon the actuators 406 and 407 which control the throttles 404 and 405, can maintain the required pressure before the users 402 and 403. The output signal of each of the controllers 408 and 409 is fed into the program switch 412. This switch 412 then compares the pressure levels before the throttles 404 and 405 and switches the output signals of the controllers 408 and 409 so that the controller which has the lower pressure before its throttle controls the set point device 415 which makes the set point for the automatic control system 413. The controller which has the higher pressure before its throttle, controls its own throttle.

Turning now to the automatic control system 413 of FIG. 4, assume that at some moment the consumption of the compressed fluid is at a maximum. Assume also, that the loss of pressure in the pipeline before the group of users 403 is bigger than the loss of pressure before the group of users 402 and consequently the pressure before the throttle 405 is smaller than the pressure before the throttle 404, and assume also that the throttle 405 is completely open. In accordance with these assumptions, the program switch 412 switches the output signal of the controller 409 to the setting device 415 and the output signal of the controller 408 to the actuator 406 of throttle 404.

When the consumption of the group of users 403 is reduced, the controller 409, acting on the setting device 415 reduces, by means of the automatic control system 413, the output of the group of compressing means 401. As a result, the pressure after this group of units 401 reduces and the pressure before the group of the users 403 is maintained at the desired level. As a result of reducing the pressure after the group of the compressing means 401, the pressure before the group of the users 402 also reduces. In order to restore the pressure before the group 402, the controller 408 opens the throttle 404 to the required magnitude. As a result of reducing the pressure after the group 401, the throttle 404, while maintaining a constant pressure before the users 402, can move to the wholly open position. In such a case, both of the throttles 404 and 405 are in completely open positions. If at a later time the pressure before throttle 404 becomes smaller than the pressure before the throttle 405, the switch 412 will switch on the output signal of the controller 408 to the setting device 415 and the output signal of the controller 409 to the throttle 405. The controller 408, by increasing the pressure in the network of the compressed medium, will then restore the pressure before the users 402, and the controller 409, restoring the pressure before the group of users 403, will then close the throttle 405 to the required magnitude.

At that point, if the consumption of the group of the users 403 decreases and, coordinately, the pressure before it increases, then the controller 409 will sense this change and will close the throttle 405 to the required magnitude. Therefore, because of the reduction of consumption of the group of users 403, the loss of the pressure on the common section 416 of the pipeline will also decrease and accordingly the pressure before the users 402 will increase. As a result, the controller 408 acting on the setting device 415 will then change the adjustment of the automatic control system 413 and it will begin to maintain the lower pressure. Consequently, there will be established each time after each group of means 401, that level of pressure which is needed in order to exclude throttling before at least one of the groups of users of the medium.

It is evident that if further reduction of pressure was allowed to occur before the group of means 401, at least one of the group of users would not get the required pressure. On the other hand, in the instance where the pressure after the group 401 is maintained on a higher level, then the throttling will take place before all of the groups of the users without exception, thereby wasting significant energy in the form of pressure. It follows, therefore, that the proposed improved method of this invention allows maintaining, at any moment the minimum possible pressure after group 401, and consequently provides for a minimum of energy expended for the compressing of fluids. To obtain this result is one of the main purposes of this invention. Another purpose, improved pressure control before the users, is also achieved.

In an analogous way the pressure just after a group of sources may be controlled by this improved method resulting in similar savings of energy, improved pressure control and other earlier named benefits.

Figure 5:
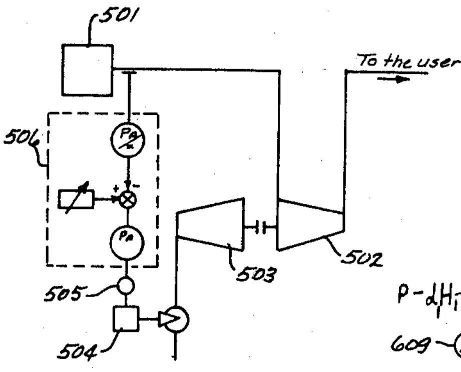
FIG. 5 shows a schematic diagram for the automatic control of pressure just after a source of a fluid which then goes through the compressor to the user.

Referring now to FIG. 5, an automatic control system is shown for a network of compressed fluid. This system includes a source 501 of compressed fluid, a turbocompressor 502 with an associated drive unit 503, a controller 504 for controlling the speed of rotation of turbocompressor 502 and a program setting device 505, and a pressure controller 506 for controlling the pressure of fluid after the source 501. The control action of the setting or high limiting device 505 is such that the output never exceeds a predetermined high limit value.

The source 501 of compressed fluids represents, for example, a technological unit in a chemical plant. The product produced by this source can be, for example, a specific gas. Assuming that the technological process for this source demands that a given pressure be maintained on its outlet with a definite precision, and assuming also that the pressure before the source 501 is maintained constant by a separate control system which will not now be discussed, the pressure after the source is maintained constant by a proportional plus reset pressure controller 506 which controls the setting or high limiting device 505 of the system 504, which in turn controls the speed of rotation of the turbocompressor 502.

By changing the speed of rotation the output and the compression ratio of the turbocompressor 502 also change. Downstream of the compressor 502 the compressed gas goes to the user.

The operation of the system of FIG. 5 will be clearly understood from the following example. Assume that at a given moment the flow rate of the gas leaving the source 501 is at a maximum and that the speed of rotation of the turbocompressor 502 is also at a maximum. Also, the pressure just after the source 501 is equal to the required level. If the consumption of gas is reduced, then the pressure after the source will increase as a result of this reduction of consumption. The pressure controller 506 acting through the setting or high limiting device 505 of the automatic control system 504 will then reduce the speed of rotation of the compressor 502 and in this way the pressure after the source 501 will be reduced to the desired level. In such an instance, the compression ratio of the turbocompressor 502 will decrease. If the consumption of gas is increased, the process of controlling will be accomplished in a reverse manner.

The setting or high limiting device 505 of the controller of speed of rotation of the turbocompressor 502 is itself an element having a saturating zone. Therefore when the output signal of the setting or high limiting device 505 reaches its maximum magnitude, corresponding to saturation zone, then the speed of rotation of the compressor will remain invariable even under further increasing consumption.

Figure 6:
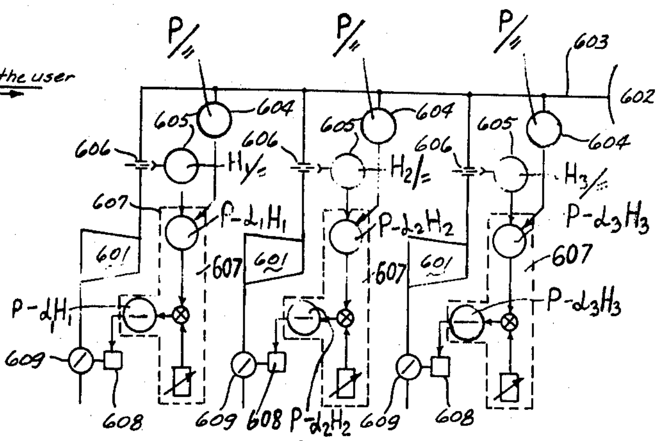
FIG. 6 shows a schematic diagram for automatic control of a network of fluid having one group of users and one group of turbomachines working in parallel.

FIG. 6 shows an automatic control system for a network of compressed fluid and includes a compressing station equipped with compressing means of dynamic type 601 working in parallel. This station supplies a group of users 602 with a compressed fluid. A pipeline 603 is provided to connect the common discharge headers of the dynamic compressing means 601 with the group of users 602. Pressure transducers 604 sense the pressure in the delivery of each machine. Transducers 605 sense the dynamic difference of pressures in the measuring devices 606 installed in the discharge headers of each of the machines. While the controllers 607 control the relationship between the pressure and the dynamic difference of pressures of each of machines. Actuators 608 operate control members for each respective machine or their prime movers.

The means for compression of fluids can be turbopumps or turbocompressors with any kind of prime movers, such as electrical, steam turbines, gas turbines, etc.

The proportional plus reset controllers for each of said machines, controlling the actuators 608, according to formula (7) provides for changing the pressure after the compressing station by the following law:

$$P_A - a\frac{\sum_{i=1}^{n} G_i^2}{\gamma_A} = \text{const}, \quad (12)$$

where $P_A$ and $\gamma_A$ are correspondingly pressure and specific weight of the compressed medium in the common pipeline after the compressing station; $G_i$ is the mass flow rate of fluid through each of the turbomachines; "$i$" is the ordinal number of a given machine; "$n$" is the number of machines. While changing the consumption of compressed fluid, the controllers 607 simultaneously change the characteristics of each turbomachine according to formula (9), acting through the actuators 608 on control members 609 either of the turbomachines 601 or of their prime movers. It is important to note that this control system provides not only for changing the pressure of the station according to a given rule, but also for an automatic distribution of the common load between the compressing means units working in parallel. The adjustment of the controllers 607 is realized in such a way that under a maximum consumption of the compressed fluid and at a required pressure before the users, all of the turbomachines would work with a maximum possible output for the given consitions of suction. A proportional plus reset controller generally is defined as a controller having a control action in which the output is proportional to a linear combination of the input and the time integral of the input.

Figure 7:
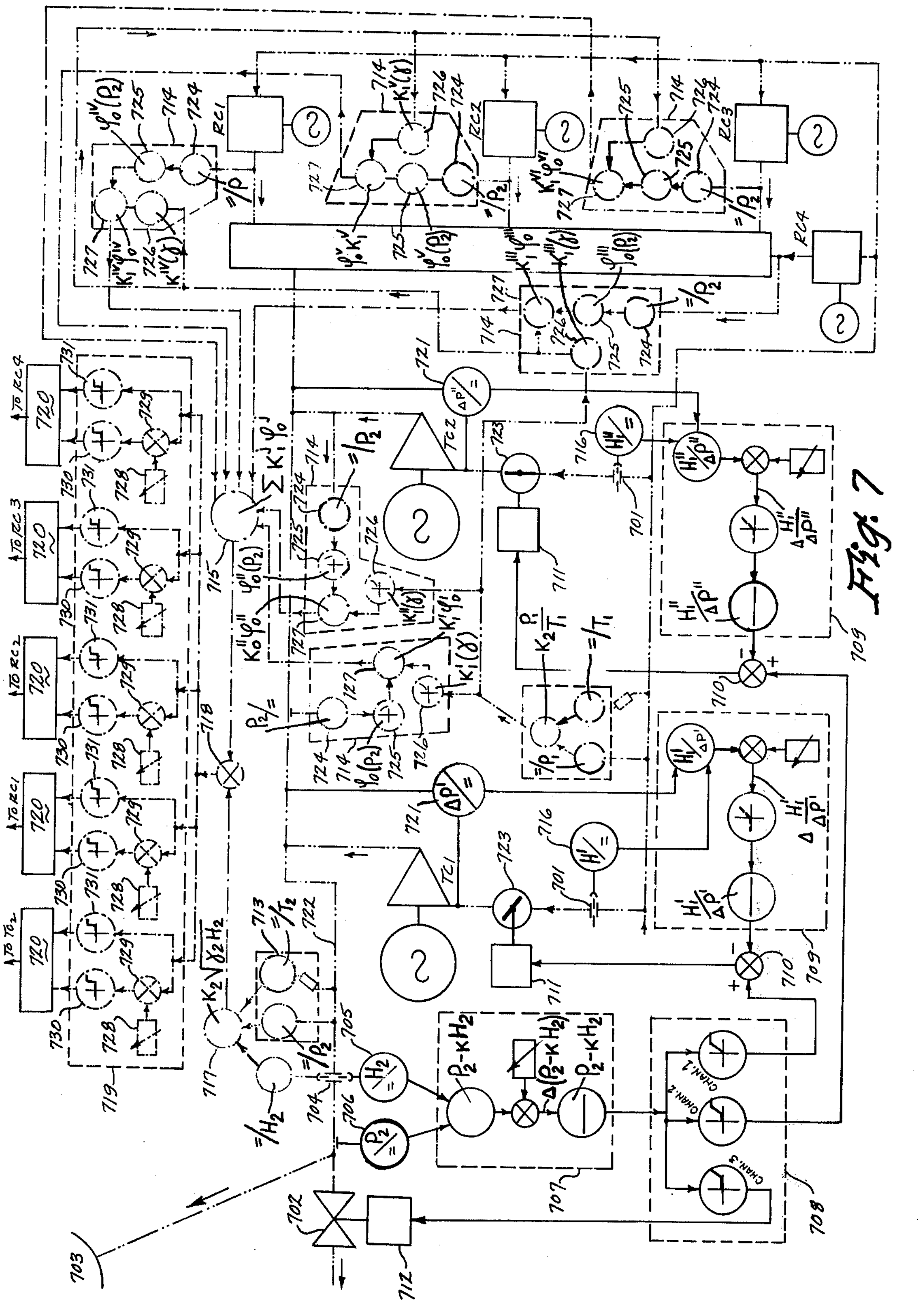
FIG. 7 shows a schematic diagram of automatic control for a group of compressing means supplying a compressed gas to one group of users.

Referring now to FIG. 7, a control system for a network of compressed gases is shown. This system includes a group of turbocompressors TC1 and TC2 and four reciprocating compressors from RC1 to RC4 working in parallel. A discharge or bypass valve 702 is provided for the whole group of compressors. This valve 702 is connected to a pipe leading to the users 703. A device 704 measuring dynamic difference of pressures is installed on the common section of the discharge header 722. A transducer 705 senses the difference of dynamic pressures on measuring device 704, and a transducer 706 senses pressure in the discharge header, and the output of the transducers 705 and 706 are inputs into an automatic controller 707. This automatic controller 707 controls the relationship between the difference of pressures in measuring device 704 and the pressure in the discharge header equipped with distributive device 708. Controllers 709 control the minimum admissible output of each of the turbocompressors TC1 and TC2. Summarizing devices 710 control the actuators 711 of the control members 723 of turbocompressors TC1 and TC2. The summarizing devices 710 produce output signals which represent an algebraic summation of the input signals. The actuator 712 actuates the discharge or bypass valve 702. A transducer 713 senses the specific weight of the gas in the discharge header 722 and sends output signals to the calculating device 717. Calculating devices 714 determine, under any given conditions of suction and delivery, the maximum possible output of each of the compressors. A device 715 determines the maximum possible total output of the group of compressors working in parallel. Transducers 716 sense the dynamic difference of pressures on measuring devices 701 installed in the suction side of each of the turbocompressing units TC1 and TC2. A calculating device 717 calculates the actual total output of the whole group of compressors. A comparator 718 calculates the difference between the maximum possible output and the actual output of the whole group of compressors. Connected to the comparator device 718 is a distributive program device 719 whose output signals the program device 720 to start or stop the individual compressors.

All the reciprocating compressors from RC1 to RC4 are controlled only by starting and stopping.

In some cases, it can be expedient to control one of the turbocompressors, for instance, TC2, in the same way.

Devices 721 are provided for measuring the difference of pressures in the outlet and suction of each of the turbocompressors.

According to formulas (5) to (6), controller 707 maintains a constant pressure before the group of users 703 during changes of consumption of the gas.

Assume first that the output signal of the automatic controller can control both turbocompressors. This output signal is fed into the distributive device 708. The distributive device 708 includes three channels, each of which is a saturating element with a dead zone. Device 708 is tuned so that the output signal of each its successive channel appears only when the output signal of the previous channel reaches its maximum magnitude corresponding to saturation. The static characteristic of the distributive device 708 is shown on FIG. 8.

The controllers 709 of the minimal admissable flow rate of the controlled turbocompressors TC1 and TC2 are proportional plus reset controllers of the relationship between the output signals of the transducers 716 of dynamic differences of pressures and transducers 721 of difference of pressures after and before each of turbocompressors.

The equation of operation of these controllers is analogous to the equation of the surge line which is well approximated by the formula:

$$\frac{Q^2}{T_1} = D\left(\frac{P_2}{P_1} - 1\right) \quad (13)$$

where "$Q$" is the volume flow rate of gas through the measuring devices 701 installed in the suction side of each turbocompressor; $T_1$ and $P_1$ are correspondingly the absolute temperature and pressure of the gas before the compressor; $P_2$ is the pressure of the gas after the compressors; and "$D$" is a constant coefficient.

This can be shown as follows:

The equation of the control line of controller 709 is:

$$H_1 = M_1(P_2 - P_1) \quad (14)$$

but the dynamic difference of pressures on any of measuring devices 701:

$$H_1 = \frac{M_2 Q^2 P_1}{T_1} \quad (15)$$

where $M_2$ is a constant coefficient.

Combining equations (14) and (15), the following is obtained:

$$\frac{Q^2 P_1}{T_1} = \frac{M_1}{M_2} P_1\left(\frac{P_2}{P_1} - 1\right) \quad (16)$$

or $$\frac{Q^2}{T_1} = K_1\left(\frac{P_2}{P_1} - 1\right)$$

It is quite evident that when the conditions of suction of the compressors change, then the control lines of the controllers 709, (O'B' and O"B" on FIG. 9) described by the equation (16), follows the changing position of the surge lines, (O'A' and O"A" on FIG. 9) of compressors. It is also evident that for reliable protection of a compressor from surge, it is necessary and sufficient to keep the following relationship of the constant coefficients in equations (13) and (16): $K_1 > D$. This can be simply effected by proper adjusting of the control system.

The output signals of each of the channels of the distributive device 708 and output signals of each of controllers 709 are summarized in devices 710, each of which controls the actuator 711 of the control member of each corresponding turbocompressor, the displacement of each of the actuators 711 being proportional to the output signal of device 710. Each of the controllers 709 is constructed such that its output signal appears only after the output of the corresponding compressor is reduced down to the minimum admissable magnitude for the given pressure in the delivery and given conditions in suction. Therefore, in all of the output range of a given compressor from the maximum to the minimum admissible magnitude, (lines CD and EF on FIG. 9) the output signal of the summarizing device 710 stays equal to the output signal of corresponding channel of device 708.

Figure 9:
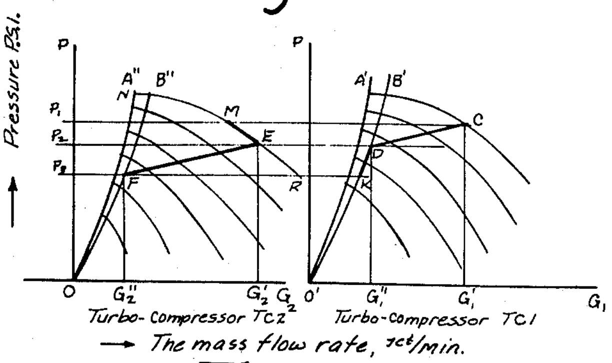
FIG. 9 shows the gas dynamic characteristics of the compressors TC1 and TC2 shown on FIG. 7 with the plotted lines of operating conditions and the lines of minimal admissible outputs.

Assume that in an initial moment, turbocompressors TC1 and TC2 work with maximal possible output which corresponds to points "C" and "M" on FIG. 9, pressure in delivery being equal to $P_1$.

If the consumption of compressed gas is reduced, then the output signal of controller 707 (FIG. 7) working through the channel 1 of device 708, device 710 and actuator 711 begins to reduce the output of turbocompressor TC1 according to formulas 5 and 6. When the output of TC1 reduces from $G_1'$ down to $G_1''$ (FIG. 9), then the line of operating conditions CD crosses the line of minimal admissable output O'B'.

During the time, when TC1 reduces its output from $G_1'$ to $G_1''$, the position of the main control member of TC2 stays unchanged. Consequently the gas dynamic characteristic of TC2 corresponds to the whole opening of its main control member 723 (FIG. 7).

Figure 8:
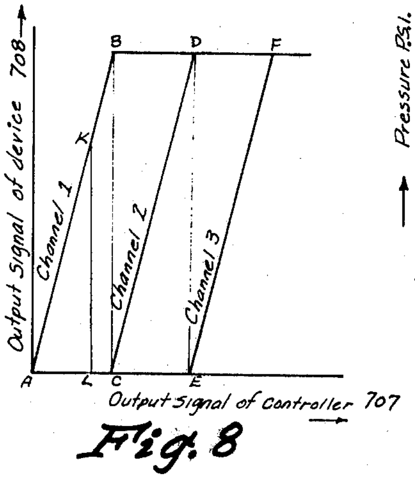
FIG. 8 shows the static characteristics of the distributive device 8 shown on FIG. 7.

Assume that in the moment when the line of operating conditions of turbocompressor TC1 crosses its minimal admissable output line O'B' in point "D" (FIG. 9), the magnitude of the output signal of the controller 707 (FIG. 7) corresponds to the point "L" (FIG. 8).

It is evident from FIG. 9 that the point "D" corresponds at the same time to the control lines of both controllers 707 and 709 (FIG. 7). Because both these controllers 707 and 709 are proportional plus reset controllers, therefore, the point "D" is the only possible working point of the compressor TC1 which justifies the operational lines of both controllers.

For this reason, from the moment controller 709 (FIG. 7) begins to operate and until such time that the output signal of the channel 1 of the device 708 (FIG. 7) achieves its maximum magnitude (Point "B"-FIG. 8), at any given moment the output signal of controller 709 will be exactly equal to the output signal of channel 1 of device 708.

As a result, during the period of time that the signal of Channel 1 increases from "K" to "B" (FIG. 8), the output signal of summarizing device 710 will stay equal to zero. Consequently, the compressor TC1 will stay in point "D" and TC2 in point "E" (FIG. 9). So, should there be a further reduction of consumption of the compressed gas after compressor TC1 reaches point "D" (FIG. 9) then the output signal of channel 1 of device 708 (FIG. 7) will increase and finally will achieve its maximal magnitude (point "B" on FIG. 8).

If the consumption after that will continue to decrease, then the output signal of controller 707 (FIG. 7) will continue to increase, and the output of channel 1 of device 708 will saturate point "B" on FIG. 8 and the output signal of channel 2 on device 708 will appear and begin to increase (point "C" on FIG. 8). With further reduction of consumption the output signal of controller 707 (FIG. 7) through channel 2 of device 708 will begin to control the actuator 711 of compressor TC2, thus reducing its output.

The line of operating conditions of TC2 will in this case, be the line EF on FIG. 9. The corresponding line of TC1 is the line DK—the section of the line O'B' of minimal admissable output of TC1. (It will be recalled that after the output signal of channel 2 of device 708 began to increase, then compressor TC1 is controlled only by its controller 709, because the output signal of channel 1 of device 708 is saturated).

While further reducing of consumption compressor TC2 reaches point "F" on its minimal admissable output line O''B'' (FIG. 9), then the output signal of channel 2 of device 708 (FIG. 7) will increase to the point "D" (FIG. 8), and therefore is saturated.

After that if the consumption continues to decrease then the output of channel 3 of device 708 will appear and start to increase (point "E" on FIG. 8) and will control through actuator 712 bypass valve 702. During this time compressors TC1 and TC2 are controlled only by their controllers 709.

Assume now that TC1 is the only controlled compressor of the whole group shown on FIG. 7. All the rest of the machinery are controlled only by starting and stopping. The operation in this case will be described below.

The present system is designed so that each of the devices 714 (FIG. 7) receives the signals from the transducers of pressure 724 in the delivery of the corresponding compressor and from the transducers of specific weight of gas 726 in the compressor suction. The equation of the maximum possible output of each of the compressors (corresponding for example, for turbocompressors to either the completely open position of its main control member or the maximum speed of rotation if the speed of rotation may be changed in the controlling process) is as follows:

$$G\max = \phi(P,\gamma) \qquad (17)$$

where "$P$" is pressure in delivery, and $\gamma$ is the specific weight of the gas in the suction.

In general, the maximum possible output represents a non-linear function of two variable magnitudes. Such a function may be approximated with high precision, for example, by non-linear devices according to the equation:

$$G\max = \phi_o(P)\cdot K_1^{av}(\gamma) \qquad (18)$$

where:

$\phi_o(P)$ is the dependence between Gmax and P under $\gamma=\gamma_{max}$, and $K_1^{av}(\gamma)$ is an averaged correlation function, which can be determined in the following way.

Figure 10:
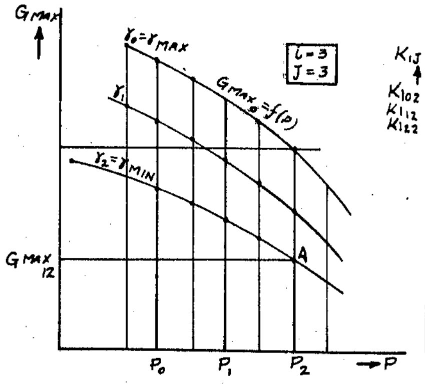
FIGS. 10, 11 and 12 are graphs demonstrating the method of estimating the maximum possible flow rates of compressors shown on FIG. 7.

One builds the number of dependences $G\max = f(P)$, each of which corresponds to a certain magnitude of $\gamma$. On a diagram obtained in such a way (FIG. 10), a number of verticals can be built, each of which is described by the equation $P$=const.

The upper curve (FIG. 10), corresponding to $\gamma=\gamma\max$, is taken as the initial curve. Its equation is $G\max,o = f_o(P)$.

The coefficients $K_{1ij}$ represent the quotient $$K_{1_{ij}} = \frac{G_{max,ij}}{G_{max,oj}},$$

where $G$max,oj and $G$max,ij are taken each time under the same value of $P_j$, "$i$" is the number of dependences each of which is $G\max,i = f_i(P)$, and "$j$" is the number of verticals, each of which can be described by the equation $P_j$ = const. For example, for the point "A", FIG. 10, the coefficient $$K_{1_{22}} = \frac{G_{max,12}}{G_{max,02}}.$$

Figure 11:
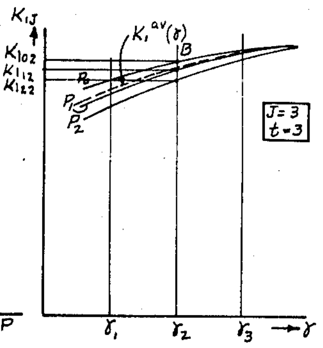

Having calculated "$i$" magnitudes of $K_{1i}$ for each value of $P_j$, it is now possible to build the family of "$j$" curves, $K_{1j} = \phi_1(\gamma_1 P)$ (FIG. 11) each of which will correspond to a definite magnitude of $P_j$.

The family of curves $K_{ij}$ may be simply approximated by one curve, for example, by the method of the least squares. Since this curve, $K_1^{av}(\gamma)$, does not depend on P, it is possible to use it in equation (18) as the averaged correlation function. It has been determined by empirical research that, in the majority of compressor machines and for most practical purposes, the same correlation function can be used.

However, in cases where more precision is demanded, it is possible to use a second approximation. For this purpose, on the diagram of the family of curves $K_{ij} = \phi_1(P_1\gamma)$, the number of verticals can be plotted, each of which is described by the equation $\gamma_t$ = Const., where "$t$" is the number of the verticals. The previously chosen correlation function $K_1^{av}(\gamma)$ is taken in this case as the initial curve, after which one determines the coefficients $$K_{2_{jt}} = \frac{K_{1_{jt}}(\gamma_1 P)}{K_{1_t}^{av}(\gamma)},$$

where $K_{1_t}^{av}$ and $K_{1jt}$ are taken each time under the same value of $\gamma_t$. For example, for point "B", FIG. 11, coefficient $$K_{2_{12}} = \frac{K_{1_{12}}(\gamma_1 P)}{K_{12}^{av}(\gamma)}.$$

Figure 12:
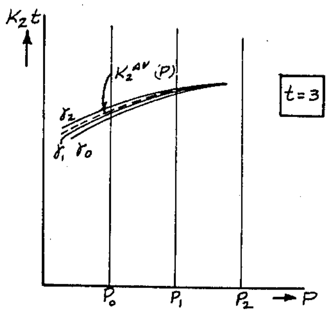

Having received "$j$" magnitudes of $K_{2jt}$ for each magnitude of $\gamma_t$, it is then possible to build the family of "$t$" curves, $K_{2t} = \phi_2(\gamma_1 P)$, FIG. 12, each of which will correspond to a definite magnitude of $\gamma_t$. The family of curves $K_{2t}$ analogously with the family of curves $K_{1ij}$, can be approximated by a curve $K_2^{av}(P)$, which does not depend on $\gamma$. Having this curve, it is possible to determine more precisely the magnitudes of the correlation function K, according to the formula $$K_1(\gamma_1 P) = K_1^{av}(\gamma) K_2^{av}(P) \quad (19)$$

The equation (18) in this case becomes $$G\max = \phi_o(P) K_1(\gamma_1 P) \quad (20)$$

The second approximation, as in the first case, can be simulated by means of non-linear devices, the number of which will be a little bigger. The precision which is provided by the second approximation is sufficient for all practical purposes.

The output signals of all of the devices 714 (FIG. 7) are summarized in the device 715. This device 715 thus works out a signal proportional to the maximum possible total output of all of the group of compressors under the given conditions. The device 717, receiving the signals of the transducer of specific weight 713 and the transducer of the dynamic difference 704 on the measuring device 705, works out a signal corresponding to the actual output of the group of machines which can be determined according to the following formula:

$$\sum_{i=1}^{6} G_i = K_4 \sqrt{\gamma_1 H}, \quad (21)$$

where "$H$" is the dynamic difference of pressures; $\gamma_1$ is the specific weight of compressed gas in the discharge header, "$i$" is the ordinal number of compressor in the group; and $K_4$ is a constant coefficient.

The output signals of the devices 715 and 717 go directly into the comparator device 718. This device 718 determines the difference between actual and the maximum possible output of the whole group of compressors (FIG. 7) under the given conditions. The output signal of the device 718 then goes to the input of the distributive program device 719. This device 719 can, for example, include several separate channels, the total number of which corresponds to the number of compressors being controlled only by starting and stopping, i.e. compressors from RC1 to RC4, and TC2.

For example, each of these channels of device 719 can consist of the following four elements:

(a) A setting device 728 which works out the set point corresponding to the output of the compressor which is intended for stopping.

(b) Comparator 729 which compares the output signals of above mentioned setting device 728 with the output signals of the device 718 and works out a deviation.

(c) A relay device 730 operating when the output signal of the above mentioned comparator 729 reaches a specified magnitude corresponding approximately to the output of that compressor which should be stopped next in turn. The output signal of this element corresponds to the command for stopping the compressor connected with the given channel and going to the corresponding device 720.

(d) A relay device 731 which operates when the output signal of device 718 reaches a certain magnitude close to but different from zero, the output signal of this device corresponds to the command for starting the compressor connected with the given channel.

The order of stopping of compressors in such a scheme is provided by the relay devices 730 of each of the channels. The setting of the devices 730 of the program device 719 can be done, for example, in the following way. Assume that there are chosen in advance the number of magnitudes of the differences between the maximum possible and the actual output of the whole group of machines, and:

$$R_1 < R_2 < R_3 < \ldots < R_i \quad (22)$$

where "$i$" is the number of compressors being controlled only by starting and stopping. In the example shown on FIG. 7, $i = 5$.

If "$j$" will be the ordinal number of a compressor, then the magnitudes of $R_j$ are chosen such that for each compressor #$j$ the magnitude $R_j$ approximately corresponds to its output. However, all of the magnitudes $R_j$ should be different according to the inequality of relationship (22). Each output magnitude of this difference is identified only with one of the above mentioned compressors and is established as a task for a corresponding channel of the device 719. Then the sequence of stopping of the compressors will be single-valuedly determined by the distribution of the magnitudes of $R_j$ between the channels of device 719 (each of which as has already been mentioned is connected with one specific compressor).

The setting of the elements 731 can be done analogously. In this case a number of magnitudes are chosen:

$$S_1 < S_2 < S_3 < \ldots < S_i \quad (23)$$

close to zero, but differing from zero. The distribution of the magnitudes $R_i$ and $S_i$ between the channels and consequently the order of stopping and starting of the compressors can in the general case be arbitrary.

The successive stopping of the compressors during a decrease of output is expedient for the following reasons. As was mentioned above, controlling the pressure in the common discharge pipeline is achieved by the successive actions on the throttles installed on the suction side of the turbocompressors. It is well known that throttling in the suction side increases the specific energy expended for compressing the gas. Therefore, it is very important that the turbocompressors utilized in the control process should be operated in that part of the field of characteristics which is located close to the curve corresponding to the completely open position of the throttle installed in suction. This can be achieved by the timely stopping of those compressors which will be controlled only by starting and stopping.

For clarity, consider an example, where the output of each reciprocating machine RC1 to RC4 (FIG. 7) is approximately 20% of the full output of each turbocompressor TC1 or TC2. A gas dynamic characteristic of turbocompressor TC1 being shown in FIG. 13.

Figure 13:
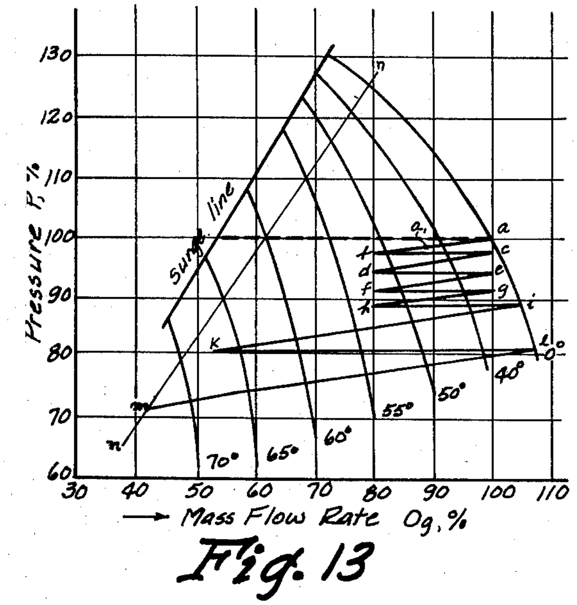
FIG. 13 is a graph demonstrating the gas dynamic characteristics of compressor TC1 shown on FIG. 7 with plotted lines of the operating conditions corresponding to the method of continuous control of the pressure while at the same time starting and stopping compressors RC1 to RC4 and TC2.

Assume now that at a given moment the consumption of gas is at a maximum (see the far right curve in FIG. 13). All six installations are simultaneously in operation, the output of each being the maximum possible under the given conditions of suction and delivery. The pressure before the group of users is then equal to a required level.

Let "$a$" (FIG. 13) be the working point of the compressor TC1. When the consumption decreases, the pressure before the group 703 of users (FIG. 7) and also the pressure in the common discharge header after the whole group of compressors, will increase. The common controller 707 of the group acting through its distributive device 708, the comperator 710 and the actuator 711 on the compressor TC1, will reduce its output. As a result, the pressure in the discharge header 22 will decrease suppose, according to formula (5), and the new stable regime will be determined by point "$a_1$", FIG. 13.

When the consumption at the group of users 703 decreases further, then the output signal of device 718 reaches the magnitude $R_1$, corresponding approximately to the output of the reciprocating compressor RC1, which will be stopped first according to the beforehand established order (point "*b*" on FIG. 13). As a result, the program device 719 sends a signal to the device 720 to stop compressor RC1. As a result of the stopping of this compressor, the controller 707, compensating for the reduced output caused by the stopping of the compressor RC1, restores the required pressure before the group of the users 703 by acting through the distributive device 708 and comparator 710 on the actuator 711 thereby increasing the output of the turbocompressor TC1. The working point of this compressor displaces accordingly from "*b*" to "*c*", (FIG. 13), i.e. returns the operation of TC1 to the area of the field of gas dynamic characteristics which is close to the full opening of the control member of this compressor.

If consumption decreases further, the device 719 successively stops the compressors RC2 (in point "*d*", FIG. 13), RC3 (in point "*f*"), RC4 (in point "*h*") and TC2 (in point "*k*"). The controlled compressor TC1 each time returning respectively to points "*e*", "*g*", "*i*", and "*l*", FIG. 13.

Using this means of control, all of the compressors except one are working at approximately steady operating conditions, under full opening of their control members, and the controlled compressor, as is clearly shown on FIG. 13, is always working under the minimum level possible of throttling in its suction.

Figure 14:
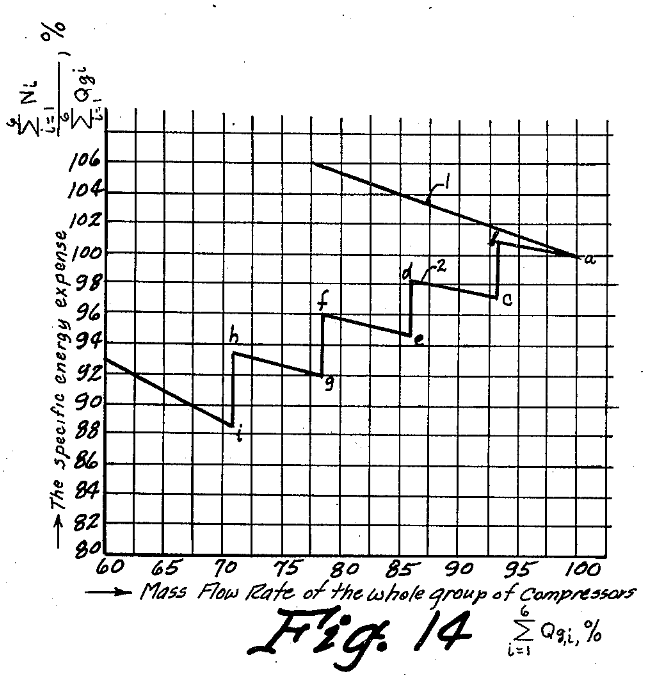
FIG. 14 demonstrates graphically the changing of the specific energy expended in compressing a fluid according to 2 different methods of controlling the group of compressors, the usual and the improved method.

It can be clearly seen in FIG. 14 that this improved method of control (curve 2) gives a big savings in the specific energy expended for compressing, as compared to the usual method which maintains a constant pressure in the common discharge header of a group of compressors (curve 1). Points "*a*", "*b*" and so forth on FIG. 14 correspond to the analogous points on the gas dynamic characteristic of compressor TC1, FIG. 13.

If after stopping all the compressors, except TC1, the consumption of the gas continues to decrease, the controller 707 will decrease the output of compressor TC1, thereby reducing the pressure in the discharge header. Referring now again to the gas dynamic characteristic of the compressor TC1 (FIG. 13), the line of operating conditions of the compressor in this case will be represented by the curve "*lm*", where "*m*" is the point of intersection of said line of operating conditions and the control line of controller 709 of minimal admissible output of the compressor.

From this point "*m*" under further decrease of consumption the control system will begin to open the by-pass valve 702 as was already described above.

When the consumption of compressed gas increases, the process of controlling will be realized in the opposite order.

In general, instead of using a controller to maintain the relationship shown in equation (5), in the system shown in FIG. 7, there can also be used a pressure controller in association with a program setting device. This program setting device will be controlled when needed by a pressure controller installed directly before the users 703 (see, for example, the previous description of FIG. 4). This is in keeping within the general scope of this invention.

It is very important to note than an analogous system can be used to maintain a required pressure at a source or groups of sources.

Figure 15:
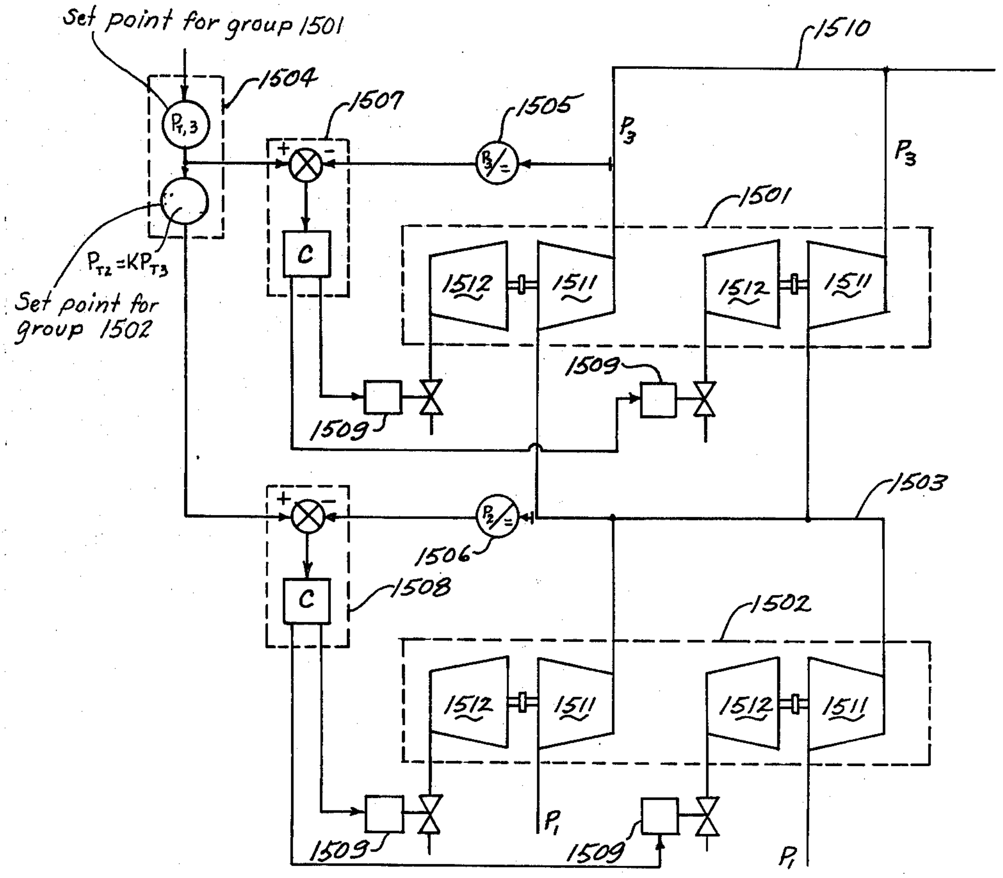
FIG. 15 shows a schematic diagram of the automatic control system of 2 groups of turbocompressors, in each of which the compressors are connected in parallel.

The automatic control system shown in FIG. 15 is intended for a compressing station which includes two groups 1501 and 1502 of dynamic type compressing means 1511 with prime movers 1512.

The compressing means in each group being connected in parallel. The discharge header 1503 of group 1502 of compressing means is also the suction header for group 1501. The control system of FIG. 15 includes: a common program setting device 1504, pressure transducers 1505 for sensing the pressure after the compressing station, transducers of pressure 1506 in the discharge header 1503, pressure controller 1507 for controlling the pressure in header 1510 after the compressing station, controller 1503, and control members 1509 which controls (for example) the prime movers 1512 of the compressing means 1511.

In FIG. 15 the program setting device 1504 carries out a certain algorithm of changing (for example, according to formulas (5) and (6)) the pressure in the discharge header 1510 of the compressing station. This setting device 1504 also provides for a constant ratio between the pressures in the discharge headers of both groups of turbomachines 1501 and 1502.

It is necessary to maintain this constant ratio in order to divide properly the load between the compressing means of the group 1501 and the group 1502 under any total output of the whole compressing station.

The pressure controllers 1507 and 1508 receiving, from one side, the output signals from setting device 1504 and from the other side, the output signals from the pressure transducers 1505 and 1506, simultaneously control the actuators 1509 of the control members of the compressing means. In this way the program setting device 1504, together with controllers 1507 and 1508 changes the pressure after the compressing station according to the required rule and also maintains a constant ratio between the pressures in the discharge headers of both groups of turbomachines 1501 and 1502.

We claim:

1. The method of controlling a system including compressing means for compressing a fluid medium, a plurality of users of the fluid medium spaced at a distance from said compressing means, said compressing means being fluidly connected to said users, and throttling means connected immediately before all but one of the users, comprising:

controlling the output of said compressing means and thereby maintaining a constant pressure immediately before the one of said users having no throttling means; and controlling the throttling means before each of the other users to thereby maintain a respective desired constant pressure before each of said other users.

2. The method of controlling a system including compressing means for compressing a fluid medium, a plurality of users of the fluid medium spaced at a distance from said compressing means, said compressing means being fluidly connected to said users, and throttling means connected immediately before all of the users, comprising:

determining which of said users has the lowest pressure before its respective throttling means and maintaining the last said throttling means completely open;

controlling the output of said compressing means and thereby maintaining a desired constant pressure immediately before the throttling means of the user having the lowest pressure before its throttling means;

controlling the pressure before each of the other users by controlling their respective throttling means.

3. A system comprising:

a compressor station including a plurality of dynamic compressors connected in parallel to a common discharge header, at least one user of the fluid;

a fluid network connecting said discharge header to said at least one user;

controlling means for controlling the pressure in said discharge header comprising:

means for changing the gas dynamic characteristics of said dynamic compressors;

a throttling means fluidly connected to said discharge header on one side thereof and fluidly connected to a point having a substantially lower pressure than the pressure in the discharge header on the other side thereof;

distributing means having separate channels, the number of channels being one more than the number of dynamic compressors, each of said channels having an output, the output of all but one of said channels corresponding to a certain one of the dynamic compressors and the output of said one channel corresponding to said throttling means; all of said channels having a common input, the output of said controlling means being connected to said common input, each of said channels being a saturating element with a dead zone, a setting of said saturating elements defining a required sequence of appearance and changing of the output signals of said channels and the output signal of each successive channel appearing simultaneously with the beginning of saturation of the output signal of the previous respective channel, thereby setting the sequence of controlling each respective dynamic compressor and said throttling means;

means associated with each of said dynamic compressors for controlling the minimum admissible output of each respective dynamic compressor required for anti-surge protection;

the output signals of said means for controlling the minimum admissible output appearing only when the corresponding dynamic compressor reaches its minimum admissible output level under existing conditions of suction and delivery;

summarizing means for calculating the algebraic sum of the output signals from said distributing means and the means for controlling the minimum admissible output, the number of summarizing means being equal to the number of dynamic compressors;

the output signals of each of said summarizing means control the means for changing the gas dynamic characteristics of corresponding dynamic compressor;

when the output of the dynamic compressor being controlled decreases down to the minimum admissible level, a corresponding output signal appears on the output of the means for controlling its minimum admissible output;

under further decreasing of consumption, the output signals of the means for controlling the minimum admissible output will exactly compensate the output signals of the corresponding channel of the distributing means, which corresponds to zero on the output of said summarizing means, until this last said output signal reaches saturation, after which the output signal will appear on the output of the next successive channel of the distributing means and correspondingly the previous dynamic compressor will be controlled only by its respective means for controlling the minimum admissible output and the output of said previous dynamic compressor, under further decreasing of consumption, will be maintained on a minimum admissible level independently of changes in the conditions of delivery and suction;

after the output signals of all channels of said distributing means connecting with the dynamic compressors reach their corresponding saturation zones, the output signal will appear on the output of the channel of distributing means connecting with said throttling means in order to control the required pressure in said common discharge header by changing the position of said throttling means, all dynamic compressors at this time being controlled only by their corresponding means for controlling minimum admissible flow rate.

* * * * *